United States Patent [19]

Johnson

[11] E Re. 28,930

[45] Reissued Aug. 17, 1976

[54] REMOVABLE INSULATED PIPE JACKET

[75] Inventor: Lowell Johnson, Chicago, Ill.

[73] Assignee: Transco Inc., Chicago, Ill.

[22] Filed: Nov. 21, 1974

[21] Appl. No.: 525,924

Related U.S. Patent Documents

Reissue of:

[64] Patent No.: 3,818,949
Issued: June 25, 1974
Appl. No.: 329,594
Filed: Feb. 5, 1973

[52] U.S. Cl. ..... 138/158; 138/149
[51] Int. Cl.[2] ..... F16L 59/14
[58] Field of Search ..... 138/147, 149, 157, 158, 138/162, DIG. 4, DIG. 10

[56] References Cited

UNITED STATES PATENTS

| | | | |
|---|---|---|---|
| 230,059 | 7/1880 | Riley | 138/149 |
| 347,631 | 8/1886 | Merriam | 138/149 |
| 1,734,209 | 11/1929 | Huffine | 138/149 |
| 2,160,009 | 5/1939 | Walker | 138/149 |
| 2,707,493 | 5/1955 | Bonvillion et al. | 138/149 X |
| 2,777,786 | 1/1957 | Schwartz et al. | 138/DIG. 10 |
| 2,841,203 | 7/1958 | Gronemeyer | 138/149 X |
| 2,861,598 | 11/1958 | Carder, Jr. et al. | 138/DIG. 10 |
| 3,004,433 | 9/1961 | Kemper | 138/149 X |
| 3,559,694 | 2/1971 | Volberg | 138/147 |
| 3,724,491 | 4/1973 | Knudsen et al. | 138/149 X |

*Primary Examiner*—Richard C. Queisser
*Assistant Examiner*—Charles Gorenstein
*Attorney, Agent, or Firm*—Edward C. Threedy

[57] ABSTRACT

A prefabricated insulated pipe jacket comprising two interlocking semicircular sections, with each section consisting of a stainless steel exterior overlay cover, an inner body of insulation and an interior protective sheet, the overlay cover and interior protective sheet being secured together to either side of the insulation by a series of spaced retaining members carried by a connector strip providing a semi-closure for the insulation while maintaining a minimum heat transfer attachment between the cover and inner protective sheet.

3 Claims, 4 Drawing Figures

REMOVABLE INSULATED PIPE JACKET

Matter enclosed in heavy brackets [ ] appears in the original patent but forms no part of this reissue specification; matter printed in italics indicates the additions made by reissue.

SUMMARY OF THE INVENTION

The primary object of the present invention is to provide a prefabricated, readily assembled, easily removable insulated pipe jacket. The jacket will comprise a pair of mating semicircular sections with each section consisting of an exterior overlay cover having exposed handles for convenient handling, an insulated panel, and an interior protective sheet. To connect the overlay cover to the interior protective sheet while restraining compression of the insulated panel between, there is provided a connector strip which extends along each marginal edge of the insulated panel. The strip provides retaining members in the form of spaced flanges having their free ends bent perpendicular to their normal plane so as to provide attaching tabs, with the flanges embracing the exposed edges of the insulated panel, while the strip and tabs allow permanent attachment to the confronting surfaces of the overlay cover and interior protective sheet respectively. This construction permits a minimum heat transfer connection between the exterior cover and the interior protective sheet. In some instances, to prevent any heat transfer all edges of the restrained insulated panel may be covered with a heat resistant foil.

GENERAL DESCRIPTION

The invention will be best understood by reference to the accompanying drawings which illustrate the preferred embodiment of the invention and in which.

Figure 1:
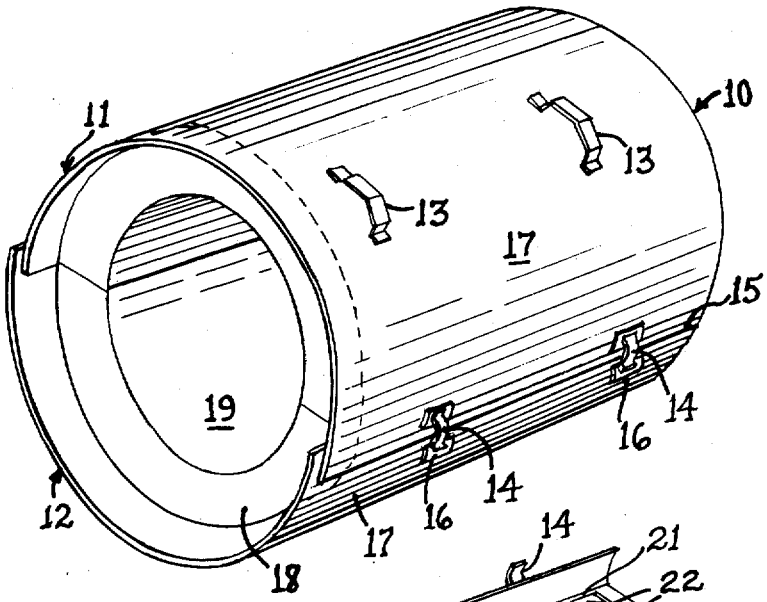
FIG. 1 is a perspective view of a completed assembled insulated pipe jacket.
Figure 4:
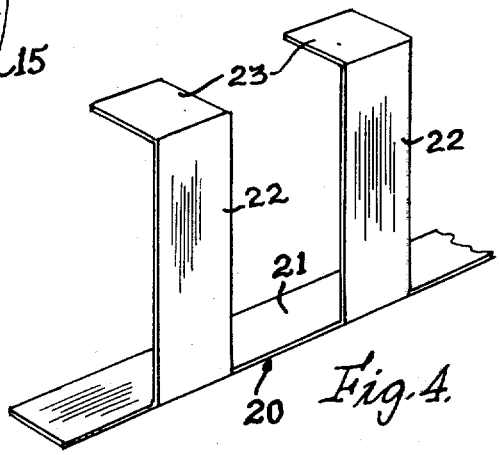
FIG. 4 is a fragmentary perspective view of the retaining means utilized in this invention.

Referring to FIG. 1, there is shown a fully assembled insulated pipe jacket 10 consisting of two semicircular sections 11 and 12. Each of the sections is of similar construction and thus only one section will be described. Such section is shown in its prefabricated assembled form in FIG. 2.

The insulated jacket 10 of FIG. 1 is shown as providing handles 13 for convenient handling of the jacket sections during their assembly about the pipe to be insulated. Each of the sections 11 and 12 is provided, respectively, with spring latch type snap fasteners 14 carried adjacent to one longitudinal edge 15 of the section, while the other section 12 of the jacket provides latch plates 16 to cooperate with the spring latches 14 for readily connecting the sections together.

Figure 2:
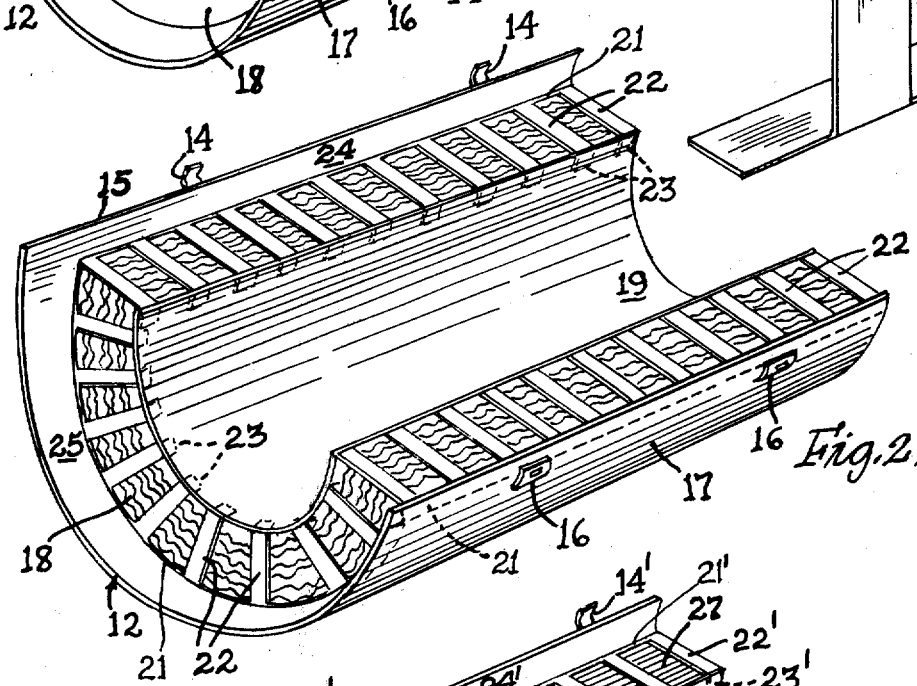
FIG. 2 is a perspective view of one section of the insulated pipe jacket.

As viewed in FIG. 2, the illustrated section 12 consists of a stainless steel exterior overlay cover 17 which forms the base for one surface of a batt of insulation 18 which may consist of layers of stainless steel aluminum foil. An interior protective sheet 19 covers the other surface of the batt of insulation 18. The batt of insulation 18 is held between the cover 17 and the interior protective sheet 19 by a restraining means 20 which consists of an elongated strip of metal 21 forming a connector strip which is readily attached to the inner surface of the overlay cover 17, as shown in dotted lines in FIG. 2.

The connector strip 21 provides a plurality of spaced apart flanges 22 extending perpendicularly to the longitudinal length of the strip 21 and which are of a length equal to the thickness of the insulated batt 18. The free ends of each of the flanges 22 provide tabs 23 bent at right angles to the flanges 22 into the condition where they extend parallel to the connector strip 21. The tabs 23 are adapted to embrace the inner surface of the batt of insulation 18 while being readily attached to the inner surface of the interior protective sheet 19 in the manner shown in dotted lines in FIG. 2.

By this arrangement, the overlay cover 17 is spaced from the interior protective sheet 19 by means 20 which also provides restraining means for the layers of aluminum foil which comprise the insulation batt 18. The interior protective sheet 19 is the component of the jacket which will be in close proximity to the heat transfer element, such as a pipe (not shown), and therefore any heat transferred through the protective sheet 19 can only be through the tabs 23 and flanges 22. The connector strip 21 is spaced and insulated from the interior sheet 19 by the insulation batt 18, as shown.

It should be noted that in the fabrication of each of the sections 11 and 12 of the jacket 10, the insulation batt 18 is so positioned relative to the cover 17 as to provide an exposed longitudinal edge portion 24 and end portion 25 extending beyond the corresponding longitudinal and end edges of the insulating batt 18. This construction permits the sections to be assembled into a complete jacket, one upon another as shown in FIG. 1, as well as being disposed longitudinally of each other, with the exposed portions of the cover of each section overlapping each other. The exposed longitudinal edge 24 and end portion 25 permits the one section to be nested relative to a cooperating section, with a facial abutment of their insulating batts 18, as shown in FIG. 1.

Figure 3:
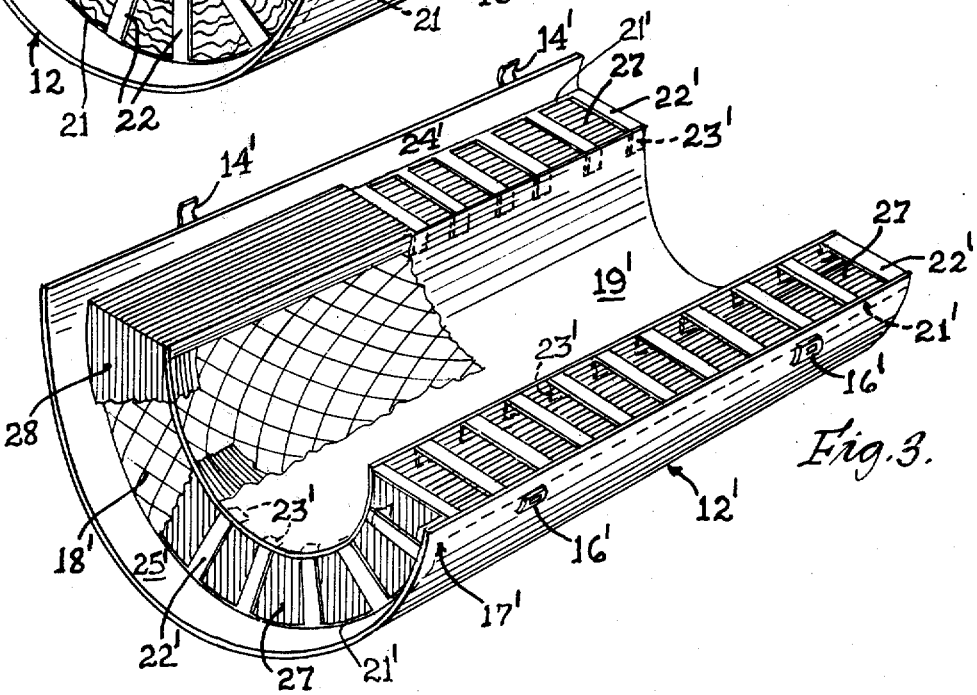
FIG. 3 is a perspective view of a modified form of the insulated pipe jacket.

In FIG. 3, there is shown a modified pipe jacket section 12' which includes all of the structure heretofore described and with such parts identified by primed reference numerals, with the section 12' having an additional construction which forms an encapsulated insulated pipe jacket. In this instance, the exposed edges and ends of the insulation batt 27 are covered by a foil wrap 28 which may be of aluminum or stainless steel, as desired.

In this modified form, the jacket section 12' not only provides a minimum of heat transfer between the exterior cover 17' and the interior protective sheet 19', but also affords a heat-reflective surface that prevents heat transfer or escape through the edges of the insulation batt 27.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A prefabricated removable insulated pipe jacket consisting of two mating semicircular longitudinal sections with each section comprising a. a semicircular outer metallic cover, b. a batt of insulation material conforming to the configuration of said cover and of a size less than said cover and positioned on the inner surface thereof exposing one end and edge of said cover, c. an interior protective sheet over the entire inner surface of said batt of insulation, d. [ an elongated connector strip providing spaced flange members extending at right angles therefrom with said flanges being equal in length to the thickness of said batt of insulation, ]

[ e. ] means [ provided by said first-mentioned means for ] *embracing the edges of said batt of insulation* connecting said cover to said interior protective sheet to either side of said batt of insulation while providing a minimum of heat transfer contact between said cover and said interior sheet,

*e. said means including an elongated connector strip providing spaced flange members extending at right angles therefrom with said flanges being equal in length to the thickness of said batt of insulation,* f. said flange members providing tabs at the free ends thereof adapted to be connected to a confronting surface of said protective sheet when said connector strip is connected to a confronting surface of said cover, g. and means for releasably securing the exposed longitudinal edge of two mating sections together to form a circular jacket for the pipe.

2. A prefabricated removable insulated pipe jacket as defined by claim 1 wherein said means for releasably securing the sections together to form a circular jacket comprise spring latch members carried adjacent the exposed longitudinal edge of said cover, with said latch member cooperating with a latch plate carried adjacent an underlying edge portion of a juxtapositioned mating section for securing the same together into said circular jacket.

3. A prefabricated removable insulated pipe jacket as defined by claim 1 further including a heat-resistant foil covering all of the edges of said insulating batt as well as said means embracing said edges so as to encapsulate said insulating batt.

* * * * *